(No Model.)  5 Sheets—Sheet 1.
J. R. ABBE.
PAPER PULP ENGINE.
No. 244,414.  Patented July 19, 1881.
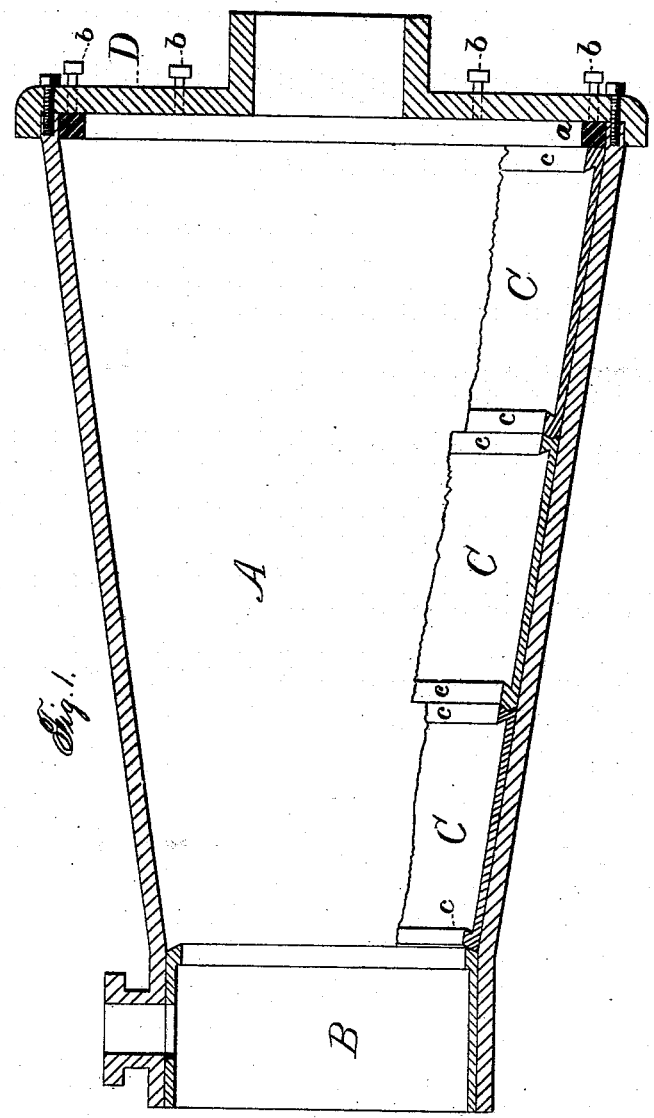
Witnesses.
John Edwards Jr.
Lyman S. Burr
Inventor.
John R. Abbe.
By James Shepard
Atty.

(No Model.)  5 Sheets—Sheet 2.
J. R. ABBE.
PAPER PULP ENGINE.
No. 244,414.  Patented July 19, 1881.
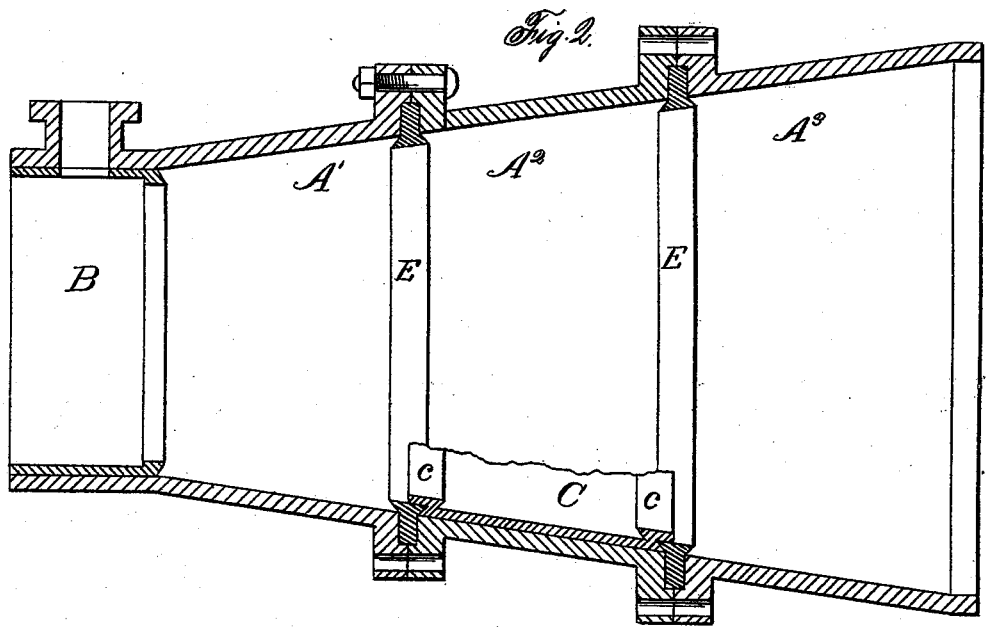
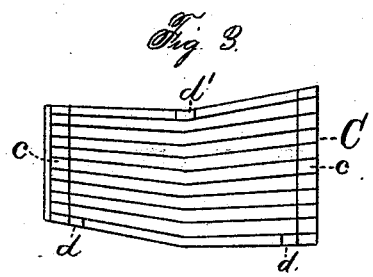
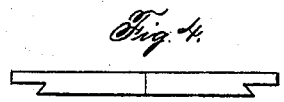
Witnesses.
John Edwards Jr.
Lyman J. Burr
Inventor
John R. Abbe.
By James Shepard
Atty.

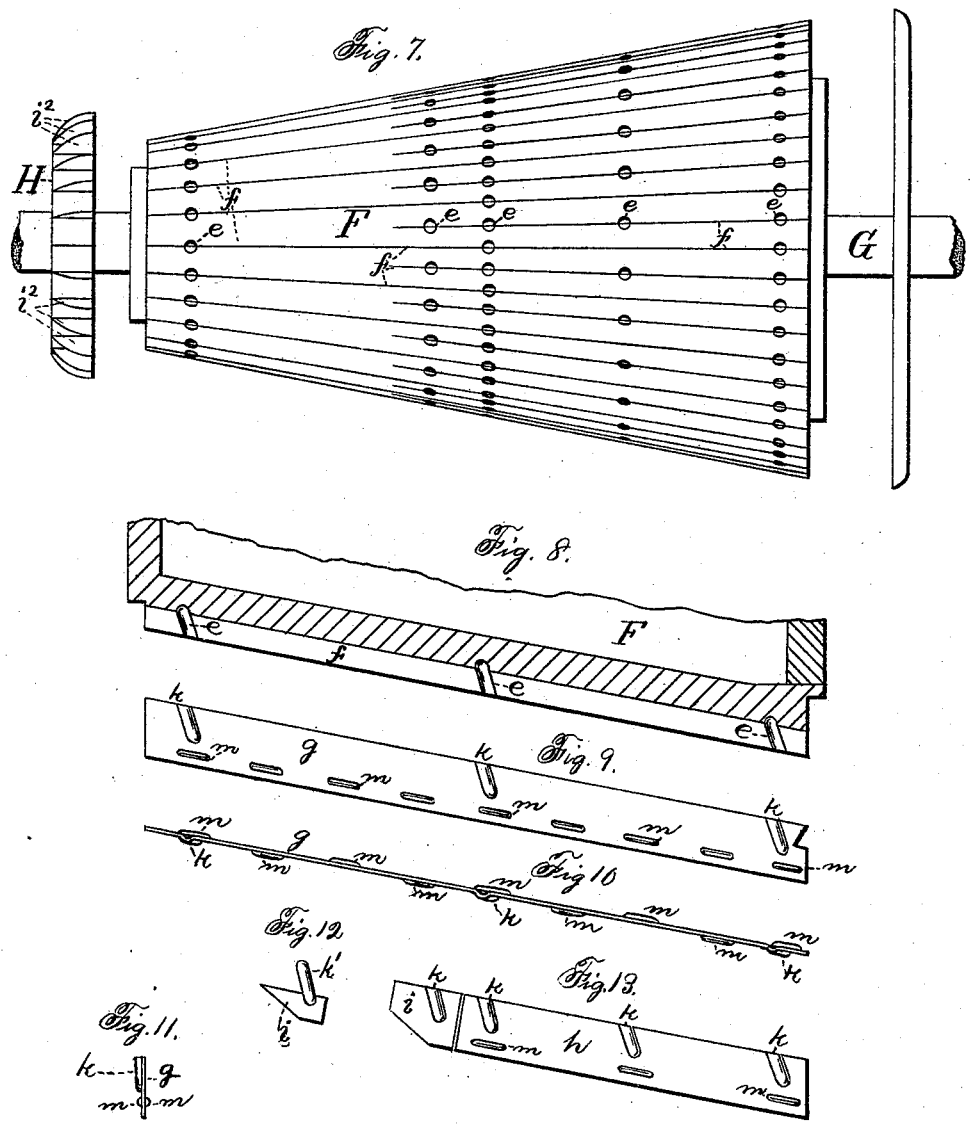

(No Model.) 5 Sheets—Sheet 4.
J. R. ABBE.
PAPER PULP ENGINE.
No. 244,414. Patented July 19, 1881.
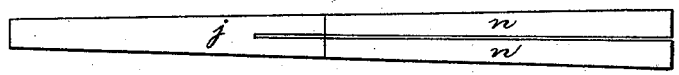
Fig. 14
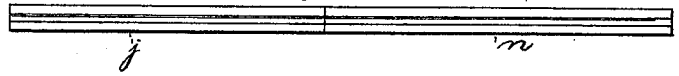
Fig. 15
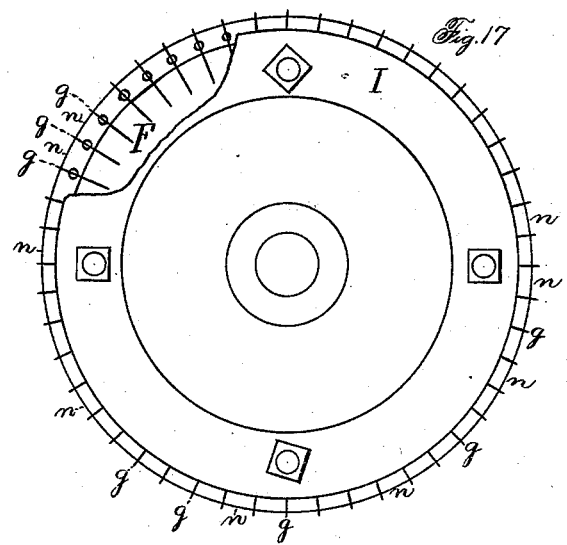
Fig. 18.
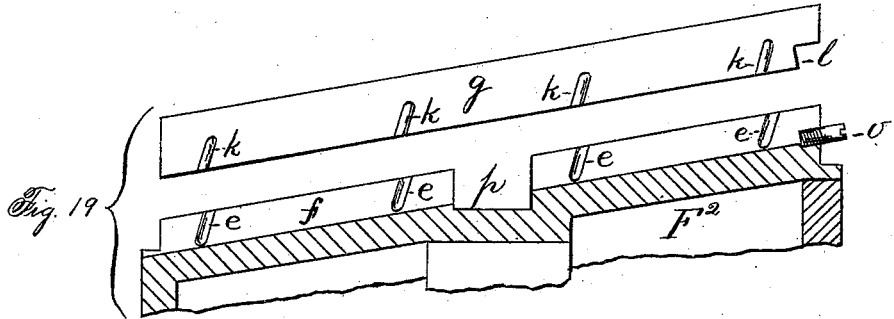
Fig. 19
Witnesses.
John Edwards Jr.
Lyman D. Burr
Inventor.
John R. Abbe
By James Shepard
Atty (No Model.) 5 Sheets—Sheet 5.

J. R. ABBE.
PAPER PULP ENGINE.

No. 244,414. Patented July 19, 1881.

Witnesses.
John Edwards Jr.
J. L. Burr

Inventor
John R. Abbe.
By James Shepard
atty

UNITED STATES PATENT OFFICE.

JOHN R. ABBE, OF SOUTH WINDHAM, CONNECTICUT.

PAPER-PULP ENGINE.

SPECIFICATION forming part of Letters Patent No. 244,414, dated July 19, 1881.

Application filed June 17, 1881. (No model.)

*To all whom it may concern:*

Be it known that I, JOHN R. ABBE, of South Windham, in the county of Windham and State of Connecticut, have invented certain new and useful Improvements in Paper-Pulp Engines, of which the following is a specification.

My invention relates to improvements in paper-pulp engines in which the female circle of knives are secured in gangs to plates having dovetailed edges at the ends, so that they interlock each other as they are secured under endwise pressure within the cone-shell; also, in which various details of construction and new devices and combinations are employed for placing and holding the knives in the cone, for securing the woods between the knives, for more thoroughly mixing the stock, for agitating and mixing the stock and perfecting the finish at the ends of the knives, and for various other purposes.

The main objects of my improvements are to so construct the gangs of knives in the female circle that there may be less space than formerly between each gang; to construct the cone without ribs, and thereby dispense with notches on the inside of the woods, so that the woods can be driven endwise into place; to fasten the knives separately within the cone; to render the machine more convenient for use, simple in construction, and more easily put together. I attain these objects by the mechanism illustrated in the accompanying drawings, in which—

Figure 20:
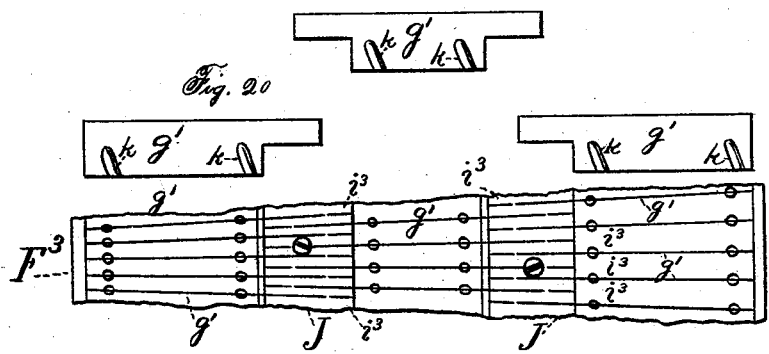
Figure 21:
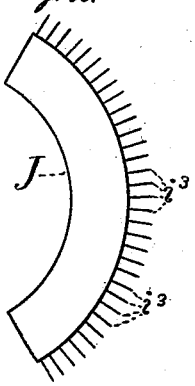
Figure 22:
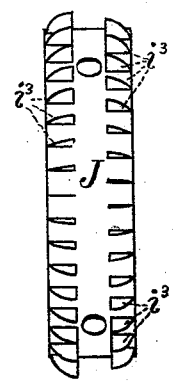
Figure 23:
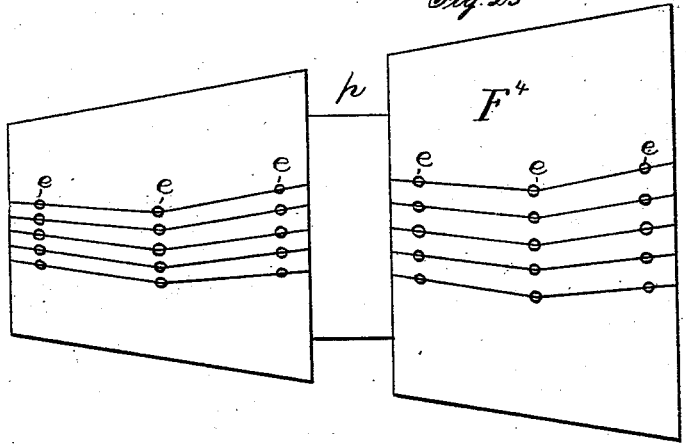

Figure 1 is a vertical section of the cone-shell and knife-holding plates. Fig. 2 is a vertical section of the same, showing a modification. Fig. 3 is a plan view of the inside of one knife-holding plate with knives attached. Fig. 4 is a side view of one of said knives. Fig. 5 is a plan view of one of the woods for placing between the knife-holding plates. Fig. 6 is a side elevation, illustrating one way of forming the cutting-edges of the cone-knives. Fig. 7 is a side elevation of the cone ready to receive the knives and woods. Fig. 8 is a vertical section taken longitudinally through the lower side of the cone. Fig. 9 is a side view of one of the long knives for the cone. Fig. 10 is an edge view, and Fig. 11 an end view, of the same. Fig. 13 is a side view of one of the short knives and agitator-plates. Fig. 12 is a side view of another style of agitator-plate to go with said short knives. Fig. 14 is a plan view of the woods for filling in between two of the long knives. Fig. 15 is a side view, and Fig. 18 is an end view, of the said woods. Fig. 16 is a side view of the ring with agitator-wings for the small end of the cone. Fig. 17 is a view of the large end of the cone. Fig. 19 shows a sectional view of a slightly-different style of cone, together with a side view of one of the long knives for said cone. Fig. 20 shows a plan view of the middle portion of another style of cone, with knives and agitator-wings secured thereto, also showing side views of the knives for filling said cone. Fig. 21 is an edge view of one of the middle agitator-plates with wings attached. Fig. 22 is a side view of the same, and Fig. 23 is a side elevation of a cone adapted to receive bent knives therein.

I make the cone-shell or casing A plain and tapering upon the inside of the main portion, as shown. At the small end I secure a bushing, B, preferably of brass or bell-metal. The inner edge of this bushing is beveled off or hooked under, as shown in Figs. 1 and 2. As in two of my prior patents, I place the knives in gangs; but I secure the knife-plates C within the shell in a novel manner, and also construct the plates and knives differently. For the purpose of securing the plates C within the shell, I make the outer end of the plates which are to fill the small end of the cone beveled off, so as to fit under the inner edge of the bushing B, as shown in Fig. 1. The opposite edge I form with a V-shaped groove, and the series of plates have their edges in the form of V-shaped ridges and grooves, so as to interlock or fit into each other, except the edge which comes at the large end of the shell. I intend to have plates enough in each series to encircle the inside of the shell A, and I prefer to make the longest edges of each plate substantially parallel to the knives held therein, as shown in Fig. 3, so that when the plates are placed edge to edge the edges may substantially fit into each other. They may abut directly together; but I prefer to place a small piece of wood, Fig. 5, between the meeting edges of all the plates in each series, for a reason hereinafter named. A portion of one knife-holding plate in each series is shown in Fig. 1, which clearly illustrates the manner of their fitting into each other at the ends of the plates. The plates should be so formed that a certain number, with the woods, Fig. 5, between, will just complete the circle and fill the inside of the shell at each series; but in case the circle is not quite large enough to fill the shell, wider woods can be placed between the plates. When the knife-holding plates with knives secured therein are thus arranged within the shell, the plain annular ring $a$ is placed at the large end, só as to bear against the edges of the end series of plates, and the head D is secured to the shell A by bolts, or in any ordinary manner. The set-screws $b$ are then forced against the ring $a$, which binds the plates together firmly within the shell. The woods, Fig. 5, are soft enough to yield as the plates are forced inward, so as to compensate for any imperfect fitting of the plates and allow all of them to be firmly bound in place. The swelling of the woods in use will only bind the plates with increased force.

I form a rib, $c$, upon the inside of each knife-holding plate C at the edges, which ribs are beveled under so as to form a wide dovetailed recess across the inside of each plate, and I dovetail the knives and the woods which go between the knives, as shown in Fig. 4, to fit this dovetailed recess, and thereby prevent them from working edgewise out of the knife-holding plates. Two lugs or projections, $d\ d$, upon the knife-holding plates C prevent the knives from coming out at one side, and the lug $d'$ prevents them from working out in the opposite direction. The lugs upon one side—preferably the lug $d'$—should be made attachable and detachable, for convenience of putting in and removing the knives from the plates.

In Fig. 2 I have shown another style of shell for receiving substantially the same kind of knife-holding plates, although the end edges are somewhat differently formed. Instead of making the plates lock into each other, I make the shell in three sections, $A'\ A^2\ A^3$, and bolt them together with dovetailed annular rings E E between the sections. The end edges of the knife-holding plates are made to fit and take under the sides of the rings E E, as shown. The knives are held within the plates in the manner hereinbefore described. The first series of plates, with knives attached and with woods, Fig. 5, between the plates, are first put into the section $A'$ before the other sections are secured thereto. The section $A^2$ and first ring E are then secured, after which the section $A^2$ is filled with a series of plates, then section $A^3$ and the other ring E are attached, after which the third series of knives may be placed in section $A^3$, and this last section may be held in place by the head or by the annular ring $a$ and head D, as hereinafter described, and illustrated in Fig. 1.

The construction of the cone and the manner of securing the knives therein are as follows:

The cone F is first made plain and of a true taper. I then drill several series of holes, $e$, in an oblique direction, preferably slanting toward the small end of the cone, as shown in Figs. 8 and 19. This cone is mounted upon the main shaft G in any ordinary manner. I then form slots $f$ for the reception of the long and short knives $g\ h$ and agitators $i$ upon lines which cut through the oblique holes and to the depth desired to have the knives let into the cone. The plane of section upon which Figs. 8 and 19 are taken passes through one of the slots for the long knives. The slots are considerable narrower than the diameter of the holes, so that projections on the knives can be received by the holes. I strike up or swage oblique ribs $k$ upon one side of the knives $g$, said ribs extending from the bottom edge inward, and, as they are formed in sheet metal, there is a hollow or depression upon the reverse side of the knives opposite each rib. Near the outer edge of the knives I swage or press ribs $m$, part of which project from one side of the knives and part of them from the opposite side, and all at a uniform distance from the edges of the knives. The edges of the woods $j\ n\ n$ are slightly grooved longitudinally to receive the ribs $m$ on the knives. The agitators $i$ for the short knives, if designed to be received in a groove in the cone, have oblique ribs $k$ on them, like the ribs on the knives, as shown in Fig. 13. If desired, however, the short grooves in the cone may be only the length of the short knives, in which case, if agitators are used, they may be provided with oblique pins $k'$, as shown in Fig. 12, by which pins they are secured in the oblique holes.

An abutment-ring, H, either with or without the agitator-wings $i^2$, is secured to the small end of the cone. These wings may be secured in any proper manner; but I prefer to cast them in. They are so set and the rings so secured to the cone that the respective wings come directly opposite the ends of the knife-slats, and when the knives are placed therein directly opposite the end of the knives.

The cone is filled as follows: First, the long knives are, one by one, placed with their bottom edge over the grooves for them, and with their ribs over the three holes which said grooves intersect. The knives are then forced obliquely inward to the bottom of the grooves. The woods $j$ for the small end of the cone are then driven endwise in between the respective knives, the ribs $m$ taking into the grooves in the edges of said woods to prevent them from working out from between the knives. If agitators are employed at the end of the short knives, they should next be inserted, and the large end of the woods $j$ should be slotted to receive them, as illustrated in Fig. 14. The short knives are then put in place with the projections $k$ entering the oblique holes. The woods $n$ are then drawn in endwise from the large end of the cone. The binding-ring I is then brought up to the end of the cone and bolted or otherwise secured in place, to firmly force the knives, wood, and cone together, and to hold the parts in place. By this construction the knives are supported by the cone for the entire length of their bottom edge, and they are held from working out radially by the projection and oblique holes at three different points, or as many points as may be desired. The surface of the cone is ribless and the inside of the woods straight instead of notched, so that the woods may be driven in endwise, and thereby more firmly bind upon and support the knives and better secure the woods in place.

If desired, the last circle of holes $a$ at the large end of the cone may be dispensed with by beveling off the ends of the knives and forming the ring I with a correspondingly-beveled face to hook over the ends of the knives and draw them toward the cone, as well as to press them endwise.

In order to secure the knives in place one at a time, instead of collectively, I form a notch in the corner of the knife which belongs at the large end of the cone $F^2$, as shown in Fig. 19, and place a small set-screw, $o$, at the end of each slot and in line therewith, so that when the knives are put in place the screw $o$ may be forced inward against the shoulder at the side of the notch $l$ and firmly bind the knife in place. This is desirable for convenience of filling the cone; and also, when a single knife or a few knives only need repairing, it is not necessary to loosen all the knives in order to take out the one or more and substitute new ones. The same ring I will be used with these set-screws to hold the woods in place; but it must be grooved out on its face side or provided with holes to admit the projecting ends of the set-screws.

While I prefer to form oblique ribs $k$ on the knives, it is evident that the same office may be performed by other forms of projections to fit into the oblique holes—as, for instance, a simple rounded boss or pin upon one side and near the bottom edge of the knives. With such projections on the knives the form of the holes may be changed by making them run straight in and then enlarge at the bottom upon one or more sides, so that the projections can hook under them by putting the knives first straight in and then moving them a little endwise. The ribs for engaging the woods may also be of different form, as it is only necessary that projections of some form extend from the sides of the knives and enter the edge of the woods. Instead of making them parallel to the edge of the knives, they may be set slightly obliquely to the length of the knives, so that when the woods swell the ribs will have a tendency to prevent the woods from moving endwise. When set-screws are used, as in Fig. 19, to secure the knives, the ends of the knives might be slit and a portion thereof bent to one side after the woods are inserted, to hold the woods from working endwise out of place, in which case the ring I may be wholly dispensed with.

In Fig. 20 I have represented a portion of a cone, $F^3$, with three series of short knives, $g'$, the oblique projections $k$ of which and the holes slant toward the large instead of the small end of said cone. I have also shown, in connection with said knives and cone, agitators-wings cast or otherwise affixed to plates in a manner similar to those in the ring H, but adapted for the middle of the cone instead of the end. The cone $F^2$ is provided with two recesses for the reception of segmental plates J, like the recess $p$ in Figs. 19 and 23. The middle portion of the cone has its grooves for the knives cut so as to break joints with the grooves at the two end portions—that is, on a line which, if continued, would extend through the middle of the space between the grooves at each end of the cone. The segmental agitator-plates have their wings $i^3$ set in the same manner, and these plates are a little narrower than the width of the recess which receives them. The plates for the recess nearest the large end of the cone $F^3$ are first put into the recess, then the knives for that end are set, after which the plates can be moved to that side of the recess and fastened to hold the knives from moving endwise, and consequently hold said knives in place. The end of the knives overlap the agitator-plates and abut against the wings at the edge which is farthest from the knife. The middle section is then set and the next set of segmental plates secured in place, when the knives for the small end of the cone may be set and held in place by a ring, like H, Figs. 7 and 16.

In Fig. 23 I have shown a cone, $F^4$, which is adapted to receive bent knives, and one set of segmental agitator-plates similar to those in Figs. 20, 21, and 22; but, if desired, these may be omitted. I intend to secure the knives in the cone by means of oblique holes and projections on the knives, as in Figs. 7, 8, 9, 10, 11, 13, 17, 19, and 20; but, instead of making the grooves in a straight line through their whole length, I form them on two or more lines and locate part of the holes at the angle of said grooves, as shown in Fig. 23. If a cone without the agitator-plates is employed for these zigzag or serpentine knives, there should be in place of the recess $p$ a middle row of holes for the middle angle of the knives. The knives are so thin that although formed straight they may readily be sprung so as to enter the zigzag grooves, and the oblique projections will somewhat facilitate making the oblique bend at the angles of the knives. When long knives are employed with agitator-plates in the middle portion of the cone, said plates should be grooved to receive the long knives at point where said long knives extend over them. By the employment of the agitators the stock is mixed better and a better finish is made for the ends of the knives, and at a trifling expense.

It has generally been customary to make the edges of the cone-knives straight; but I notch them on the cutting-edges, as shown in Fig. 6, but with the notches arranged so as not to come directly opposite each other in any two adjoining knives, $g^2$ and $g^3$, the broken lines in said figure indicating the notches upon the knife $g^3$, which knife is immediately back of the knife $g^2$. I have not illustrated in the figure the bottom edge of the knife, as this part of my improvement is applicable to cone-knives generally. It allows portions of the stock to lap over on knife before being cut off, and thereby the stock is more thoroughly mixed.

I propose that the woods for placing between the knives shall be veneered woods, as in other paper-pulp engines, and by making them straight—that is, without notches—they are specially adapted to be formed of veneers or thin laminæ throughout.

I claim as my invention—

1. The combination of the cone-shell, knife-holding plates having interlocking end edges, and mechanism for forcing the plates endwise into the shell and holding them therein, substantially as described, and for the purpose specified.

2. The combination of the cone-shell with a series of knife-holding plates having beveled end edges and mechanism for binding the plates in place through said edges, substantially as described, and for the purpose specified.

3. The combination of the cone-shell, knife-holding plates confined at their end edges, and the woods, Fig. 5, between the plates, substantially as described, and for the purpose specified.

4. The knife-holding plates having their respective end edges in the form of V-shaped ridges and grooves for interlocking with each other when confined within the cone-shell, substantially as described, and for the purpose specified.

5. The combination of the cone-shell A, bushing B, knife-holding plates C, ring $a$, head D, and screws $b$, substantially as described, and for the purpose specified.

6. The knife-holding plates C, having the undercut ribs $c$ $c$ for the reception of the knives and woods, substantially as described, and for the purpose specified.

7. The combination of the knife-holding plates having the undercut ribs $c$ $c$, the knives notched at the ends, as shown in Fig. 4, and correspondingly-shaped woods, substantially as described, and for the purpose specified.

8. The ribless cone having knife-slots and holes for the reception of knives, with side projections thereon, substantially as described, and for the purpose specified.

9. The combination of the cone having knife-slots and oblique holes, the knives having side projections to enter said holes, and mechanism for confining the knives at the ends, substantially as described, and for the purpose specified.

10. The combination of the ribless cone, the knives projecting therefrom, and woods adapted to be driven endwise into place between said knives, substantially as described, and for the purpose specified.

11. The combination of the ribless cone, the knives having ribs or projections $m$, and woods between the knives, the edges of which woods receive the ribs $m$, substantially as described, and for the purpose specified.

12. The combination of the cone having slots and holes, the knives with side projections thereon to enter said holes, and the screws $o$, or equivalent fastening mechanism, for securing the knives separately within the cone, substantially as described, and for the purpose specified.

13. The combination of the cone and knives with the abutment-ring H, having agitator-wings, substantially as described, and for the purpose specified.

14. The combination of the cone, the knives secured therein, and agitators at the ends of the knives, substantially as described, and for the purpose specified.

15. The cone-knives having their cutting-edges notched, the notches in adjoining edges alternating, substantially as described, and for the purpose specified.

JOHN R. ABBE.

Witnesses:
MYRON P. SQUIRES,
CHESTER TILDEN.